UNITED STATES PATENT OFFICE.

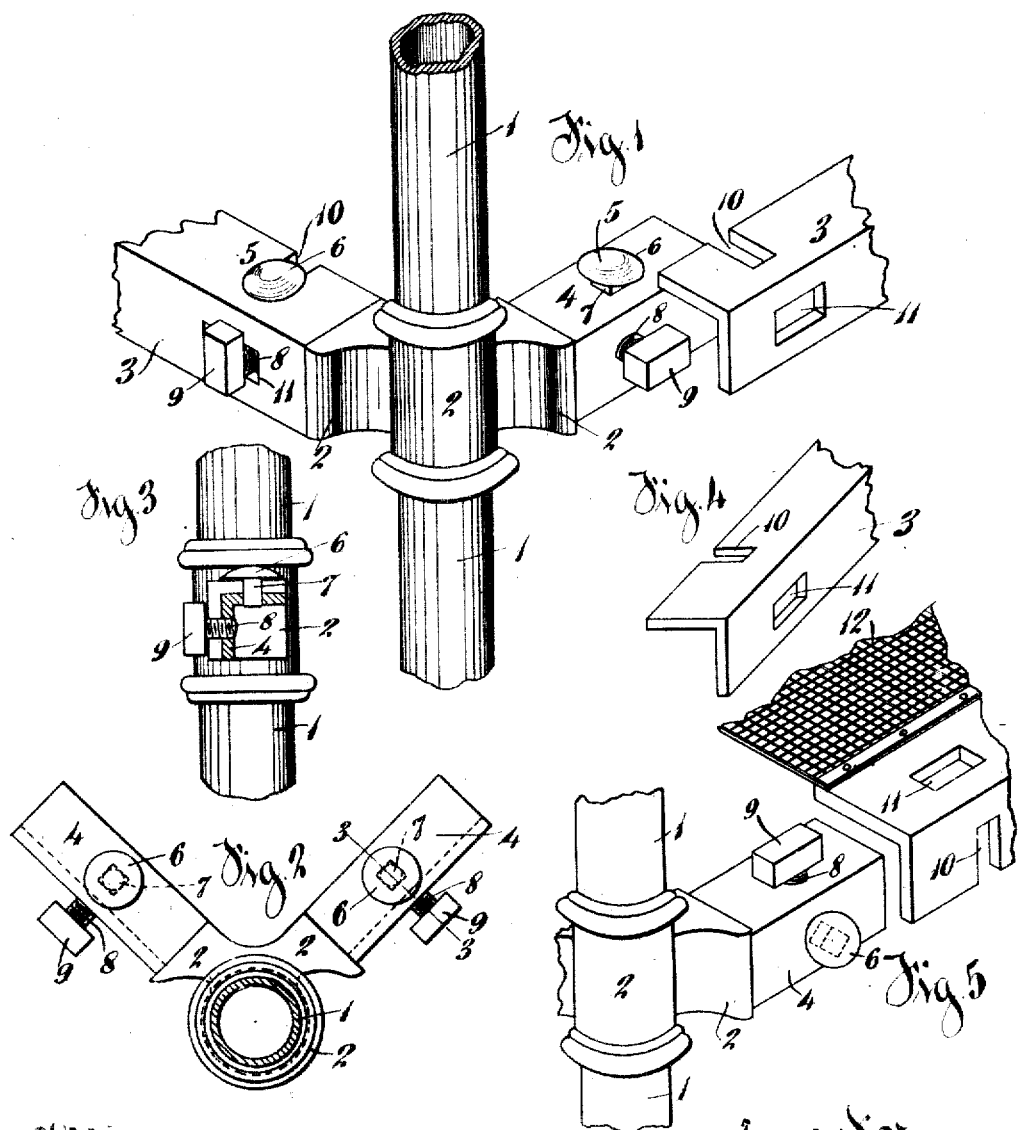

FRANKLIN B. FRENCH, OF CINCINNATI, OHIO.

METAL BED-FRAME.

950,619.

Specification of Letters Patent. Patented Mar. 1, 1910.

Application filed November 13, 1909. Serial No. 527,774.

*To all whom it may concern:*

Be it known that I, FRANKLIN B. FRENCH, a citizen of the United States, residing at Cincinnati, in the county of Hamilton and State of Ohio, have invented certain new and useful Improvements in Metal Bed-Frames, of which the following is a specification.

My invention relates to metal bed frames, and more particularly to locking means whereby the bed rails are locked to the coupling members at the corner posts.

The object of my invention is to provide a simple, neat, strong, rigid and inexpensive locking means for bed rails whereby the frame of the bed is securely held together and whereby it can be easily and quickly assembled and separated.

Another object of my invention is to provide a simple and efficient means for connecting the head and foot portions of the bed frame together for shipping and exhibition purposes.

In the drawing which serves to illustrate desired embodiments of my invention: Figure 1 is a perspective view of a coupling member and a portion of a bed post and bed rails connected thereto illustrating my invention. Fig. 2 is a plan view of the same. Fig. 3 is a section taken on the line 3—3 of Fig. 2, looking in the direction of the arrow. Fig. 4 is a perspective view of a fragment of a bed rail made according to my invention. Fig. 5 shows a modification of my invention and illustrates how it may be adapted to use where it is desired to use a particular kind of bed spring permanently secured to a bed rail made in accordance with my invention.

Referring more particularly to the drawings, as illustrated in Figs. 1 to 4, inclusive, 1 indicates a bed post having a coupling member 2 placed thereon and secured thereto in any desired manner. The coupling member 2 is provided with angular extensions 4, each having upon its upper surface a catch 5 comprising a head 6 and shank 7, which latter is secured to the rail in any suitable manner. A lock screw 8 having an oblong head is adapted to be screwed into the other face of the extension adjacent the catch 5. Each bed rail 3 is made of angle iron of the form usually employed in the construction of metal beds and is provided near each end with an oblong transverse recess 10 in its upper wing and an oblong hole 11 in its other wing and preferably adjacent thereto, the transverse recess and oblong hole being placed in the bed rail in such position as to register with the catch 5 and lock screw 8, respectively, when placing the rail in position upon the extension 4 or removing it therefrom. When it is desired to assemble the parts, turn the oblong head 9 to the position shown on the right of Fig. 1 and insert the rail laterally beneath the head 6 of the catch 5, the shank 7 of which enters the transverse recess 10 while the lock screw 8 enters the oblong hole 12 and when the rail is in proper position upon the extension as shown at the left of Fig. 1, the lock screw is turned or tightened until the oblong head extends transversely of the oblong hole and engages the surface of the rail whereby it is securely and firmly held in locked position upon the extension. It will thus be seen that the catch 5 and the lock screw 8 combine to prevent movement of the extension and rail in any direction relative to each other, thus securing an absolutely firm and safe assemblage of the parts and preventing any accidental disengagement thereof either when the parts are assembled for exhibition purposes or when secured together for use as a bed. This construction permits of easy and quick attachment and detachment of the parts.

It will be apparent that my invention is capable of some modification without material departure from the spirit or scope thereof, as, for instance, the catch 5 and lock screw 8 and the transverse recess 10 and oblong hole 11 may be transposed as shown in the modified construction illustrated in Fig. 5, in which construction the bed springs 12 are permanently attached to the bed rail and the bed rail would accordingly be placed in position upon the extensions from the top instead of from the side. This enables me to securely lock and firmly fix the bed spring to the bed rail and obtain a more secure coupling of all the parts than otherwise.

My improved form of connection will be found very convenient when it is desired to assemble the head and foot of the bed frame together for exhibition purposes when great economy of space is desired. In such cases a short rail of only a few inches in length is used to hold the head and foot of the bed together both during shipment from the factory as well as while being exhibited at the store and during shipment to the customer. When these short rails which are preferably about eight inches in length, are used there is no danger of the bed frame toppling over as is so often the case with the use of other rails. With my improvement it will be understood that the beds may be put on exhibition in the same form and connected in the same way as they are when shipped. At the same time they are practically connected up in precisely the same manner as they are when in actual use except that the rails are shorter in length. The rails are less bulky than those now in use and a dozen can be packed in the same space and weigh little more than a single pair of rails with cast ends now in use.

Some of the advantages of my invention are neatness in appearance, strength and rigidity of parts in use, simplicity in construction, efficiency in locking the parts together, lightness of parts required in shipping, while there are no loose bolts, nuts or castings to get lost in shipping. It furnishes an absolutely rigid rail lock without cast ends and combines strength, beauty and security, three valuable and essential attributes to a successful structure for this purpose.

I claim:

1. In a metal bed frame, a post, a coupling secured thereto and having an extension, a catch and a lock screw on said extension, an angle iron bed rail having a transverse recess in one wing and an oblong hole in the other wing adapted to receive said catch and lock screw, respectively, whereby said parts are locked together, substantially as set forth and for the purposes specified.

2. In a metal bed frame, a post, a coupling secured thereto and having an angular extension, a catch having a head, fixed upon one face thereof, a lock screw mounted on the other face thereof, an angle iron bed rail having a recess in one wing and a hole in the other wing adapted to receive the shank of the catch and the lock screw, respectively, whereby the parts may be fastened by turning the head of the lock screw, substantially as set forth.

3. In a metal bed frame, a post, a coupling secured thereto and having an angular extension, a catch comprising a head and a shank secured to one surface of said extension, a lock screw having an oblong head upon another surface of said extension, an angle iron bed rail having a transverse recess in one wing and an oblong hole in its other wing whereby when the bed rail is placed in position upon the angular extension, the transverse recess will receive the shank of the catch and the oblong hole will receive the lock screw, the oblong head of which is adapted to be turned transversely of the length of the hole whereby the parts are locked together, substantially as set forth.

4. In a metal bed frame, a post, a coupling secured thereto and having an extension, a catch comprising a head and a shank securely fixed to one surface of said extension, an adjustable lock screw having an oblong head upon another surface of said extension, an angle iron bed rail having a transverse recess in one wing and an oblong hole in its other wing, whereby when said bed rail is placed in position upon the angular extension the transverse recess will receive the shank of the catch and the oblong hole will receive the adjustable lock screw, the oblong head of which is adapted to be turned transversely of the length of the hole whereby the parts are firmly locked together, substantially as set forth.

5. In a metal bed frame, a post, a coupling secured thereto and having an extension, a catch comprising a head and a shank secured to one surface of said extension, a lock screw having an oblong head upon another surface of said extension, and an angle iron bed rail having a recess in one wing and a hole in its other wing, whereby when the bed rail is placed in position upon the angular extension the recess will receive the shank of the catch and the hole will receive the lock screw, the oblong head of which is adapted to be turned to engage the surface of the angle iron on opposite sides of the hole whereby the parts are locked together, substantially as set forth.

FRANKLIN B. FRENCH.

Witnesses:
JAMES N. RAMSEY,
FLORENCE HAMMEL.